United States Patent [19]
Large

[11] 3,913,439
[45] Oct. 21, 1975

[54] PORTABLE SAWMILL
[76] Inventor: Arthur Large, R.R. No. 5, North Vernon, Ind. 47265
[22] Filed: Oct. 30, 1974
[21] Appl. No.: 519,351

[52] U.S. Cl. .................. 83/707; 83/713; 83/435.1; 83/928
[51] Int. Cl.² ..... B26D 7/06; B27B 5/10; B27B 7/00
[58] Field of Search ........ 144/34 A, 34 R; 83/435.1, 83/713, 703, 704, 707, 731, 928

[56] References Cited
UNITED STATES PATENTS
1,984,492  12/1934  Peace ............................ 83/435.1 X
2,719,549  10/1955  Hemshrodt ...................... 83/928 X

*Primary Examiner*—Willie G. Abercrombie
*Attorney, Agent, or Firm*—William R. Coffey

[57] ABSTRACT

For use with a conventional farm tractor having, at its rear, a three-point hitch and power take-off shaft, a tractor mounted and driven sawmill comprising a central frame adapted to be mounted upon and raised and lowered by the three-point hitch, the frame including skid-type legs for engaging the ground in its lower position, a saw blade journal mounted upon the frame for rotation about a transverse axis, the frame providing a central track portion extending longitudinally and perpendicular to the journal axis of the saw, a pair of outer track portions, and connectors for rigidly and releasably connecting the outer track portions to the opposite ends of the central track portion to provide a three-section trackway perpendicular to the blade axis. A carriage is mounted on the trackway for movement therealong past the blade, and the carriage and the blade are drivingly connected to the power take-off shaft of the tractor. The sawmill has a collapsed condition with the outer track portions disconnected from the central track portion so that the sawmill can be moved by the tractor to a new location. The length of the central track portion is approximately equal to the width of the tractor, i.e., the rear drive wheels of the tractor.

13 Claims, 9 Drawing Figures

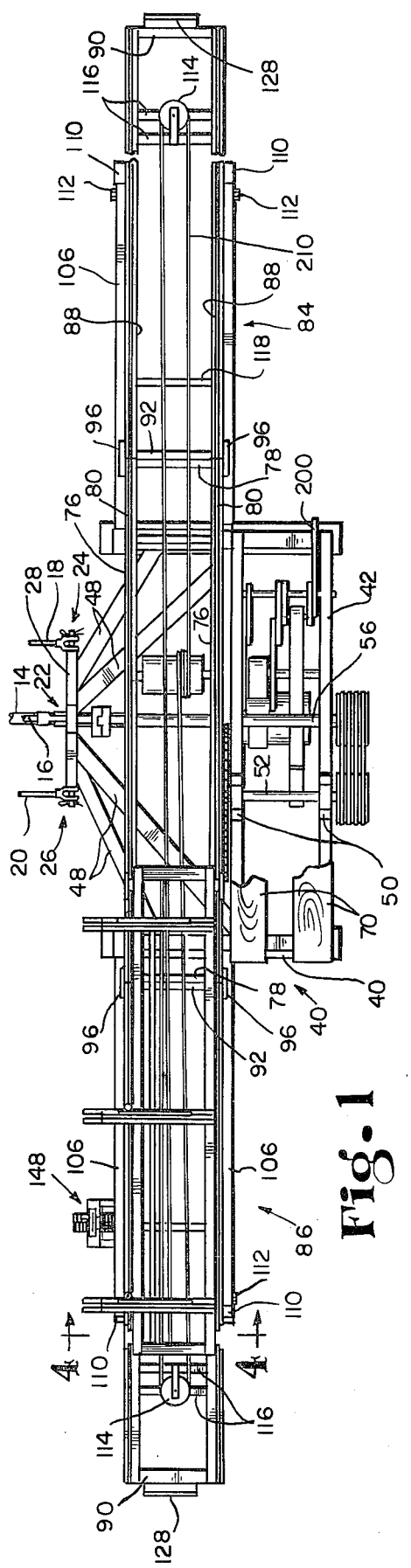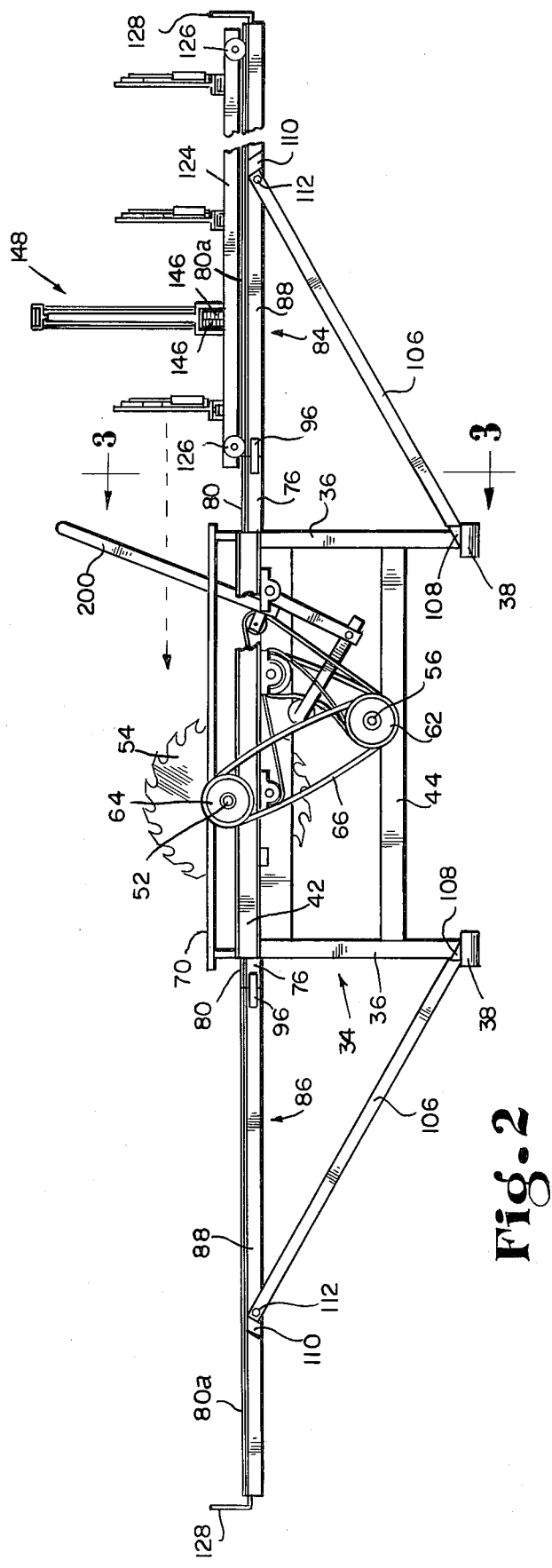

PORTABLE SAWMILL

The present invention relates to sawmills, and more particularly to the provision of a portable, collapsible sawmill which can be mounted upon a conventional farm tractor for movement with the tractor to different locations in the woods and for movement by the three-point hitch of the tractor between its lower use position and its upper carrying position. The sawmill includes a blade which is driven by the power take-off shaft of the tractor and a carriage upon which the pieces of timber are mounted which is also driven by the power take-off shaft of the tractor.

It is a primary object of my present invention to provide a tractor-mounted and tractor-driven sawmill which may be used by farmers and other people with access to wooded areas in any location where a tractor can be driven. My object is to provide a sawmill constructed such that it can be mounted upon the three-point hitch of a tractor and, in its collapsed condition, be no larger than the width of the tractor such that it can be moved to any position to which the tractor can be driven.

I am aware of allegedly portable sawmills which are mounted upon skids so that they can be pulled by tractors into wooded areas and there set up and used. The problem with such prior art equipment is that it is not always easy to pull such a hefty piece of equipment, even though it is mounted on skids, into some wooded areas and it takes a considerable amount of time to set up such equipment and get it operating. My tractor-mounted and driven sawmill is constructed so that it can be lowered to the ground by the lowering of the three-point hitch of the tractor and then set up and operated in a matter of just a very few minutes. The power source for my sawmill is the power take-off system of the tractor and particularly the power take-off shaft which extends rearwardly from the tractor.

With my tractor-mounted and driven sawmill, it will be economically feasible for an operator to take the sawmill into a wooded area there to cut into usable lumber much of the timber which is not being discarded for rot. Specifically, most of the logging operations taking place today involve a logging crew going into a wooded area and cutting down trees to remove from the wooded area only the trunk portions of such trees. It is not economically feasible for such loggers to try to take the upper portions of the trees and the heavier limbs. This very fine lumber is being left to rot in the forest in most instances, and I believe that this is a national shame, particularly in view of the great shortage of lumber and the high prices of the lumber being sold.

With my tractor-mounted and driven sawmill, it will be economically feasible to process small logs and limbs right in the forest so that it is necessary only to remove sawn planks and boards from the forest. It is not now economically feasible to try to remove short log sections and limb sections from a forest because it takes as many as three to four truckloads of such log sections and limb sections to make one truckload of usable planks and boards.

It is an object of my invention, therefore, to provide a tractor-mounted and driven sawmill particularly suited for sawing small log sections and limb sections into usable planks and boards right in the forest where such log sections and limb sections have been left by logging operations which remove only the tree trunks.

My sawmill is particularly suited for small logs and limb sections which are, for instance, six or eight inches in diameter and six or eight feet long. From such pieces of timber, I can cut substantial quantities of usable planks and boards.

My sawmill is particularly suited for producing lumber to be used in the pallet and crate industry, i.e., unfinished green lumber used in shipping and crating goods. It is my theory that my portable sawmill will permit a large portion of the good usable timber now going to waste to be used in producing pallets and crates.

My combination of a conventional farm tractor having axially spaced apart rear drive wheels, a three-point hitch and power take-off shaft extending rearwardly therefrom and the portable sawmill comprising a central frame mounted upon the said three-point hitch for movement with the tractor and for movement relative to the tractor with said hitch between an upper carrying position and a lower use position is truly unique. I am not aware of any sawmill which is to be mounted upon a tractor and driven by the power take-off shaft of the tractor. My sawmill comprises a saw blade journal mounted upon the central frame for rotation about an axis extending generally rearwardly from the tractor and, when the central frame is in its lower use position, the blade axis extends generally horizontally. The central frame provides a central track portion extending perpendicularly to the blade journal axis, the central track portion having opposite ends. A pair of outer track portions are provided together with means for rigidly and releasably connecting the outer track portions to the opposite ends, respectively, of the central track portions to provide a three-section rectilinear trackway perpendicular to the blade axis. A carriage is mounted on this trackway for reciprocation therealong past the blade, and transmission means for drivingly connecting the power take-off shaft to the blade and the carriage is provided. The carriage includes means for mounting pieces of timber thereon for movement past the blade. The sawmill has a collapsed condition for movement by the tractor with the said outer track portions disconnected from the central track portion and the carriage disposed upon the central track portion and locked against movement off of its outer ends. The two outer track portions may be mounted upon the central frame parallel to the central track portion for movement with the sawmill and tractor to a new location. The compactness of my sawmill in its collapsed condition is extremely advantageous in that it can be stored in a relatively small building when not in use and it can be moved relatively easily through dense wooded areas and over rough terrain. In its collapsed condition, my sawmill is no wider than the tractor upon which it is mounted, and this is extremely advantageous.

Other objects and features of my present invention will become apparent as this description progresses.

To the accomplishment of the above and related objects, this invention may be embodied in the form illustrated in the accompanying drawings, attention being called to the fact, however, that the drawings are illustrative only, and that changes may be made in the specific construction illustrated and described, so long as the scope of the appended claims is not violated.

In the drawings:

FIG. 1 is a plan view of my sawmill in its use condition and with the carriage at the left-hand side;

FIG. 2 is an elevational view of my sawmill with the carriage at the right-hand side as compared to FIG. 1;

Figure 3:
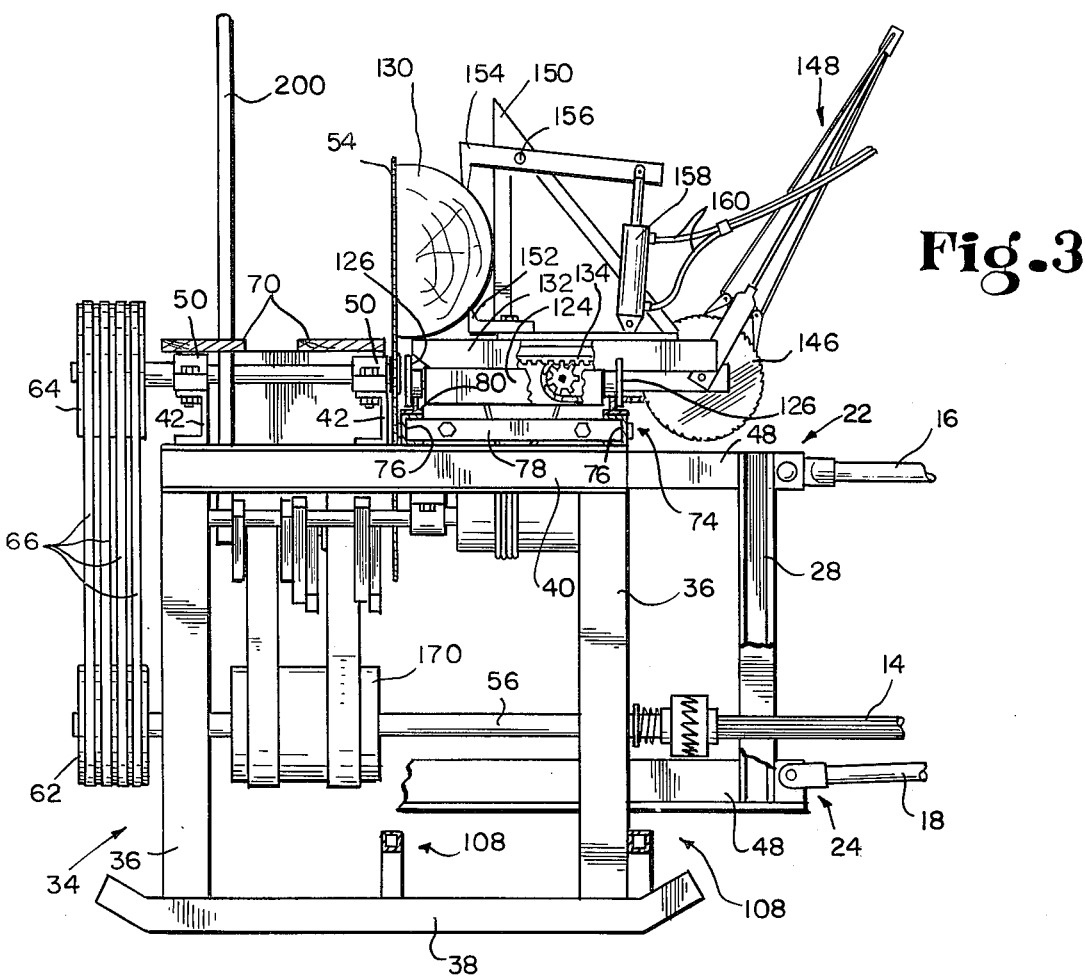
FIG. 3 is a sectional view taken along the lines 3—3 in FIG. 2.

Referring now particularly to the drawings, it will be seen that I have shown a conventional farm tractor 10 of the type conventionally including rear drive wheels 12, a power take-off shaft 14, and a three-point hitch including hitch links 16, 18, 20. These links 16, 18, 20 are connected at their distal ends, respectively, by connection pins 22, 24, 26 to an A-frame 28. It will be appreciated by those familiar with conventional farm tractors that the three-point hitch is raised and lowered hydraulically and that the power take-off shaft 14 is driven through a hydraulic transmission from the engine of the tractor.

In accordance with my invention, a central frame portion 34 provided primarily by four vertically extending legs or corner posts 36, sled runners 38, upper end braces 40, upper braces 42, and lower side braces 44 is rigidly connected to the A-frame 28 by means such as the rigid connecting members 48. The end legs 36 are connected, at their lower ends, by the sled runners 38 and, at their upper ends, by the braces 40. The two braces 42 provide a rigid platform extending from end to end of the central frame portion 34 for reasons which will be discussed hereinafter. Of course, the two side braces 44 provide strong structural support for the central frame portion 34. Connecting members 48 are best seen in FIGS. 1 and 3.

Bearing blocks 50 are mounted upon the upper surfaces of the braces 42 (FIGS. 1 and 3) to journal mount a blade shaft 52 upon which the saw blade 54 is mounted. In the lower, use position of the central frame portion 34, the blade shaft 52 extends generally horizontally, but this is not critical. A jack shaft 56 is journal mounted to extend parallel to the blade shaft 52 by means of bearing blocks 57 mounted upon the upper surfaces of the side braces 44, only one bearing block 57 being seen in the drawings. The jack shaft 56 is drivingly connected to the power take-off shaft 14 by means of a torque break-away clutch 58 which will begin to slip if, for some reason, the blade 54 is jammed or some other mechanism on the sawmill is jammed. I show a pulley 62 mounted upon the jack shaft 56 and another such pulley 64 mounted upon the blade shaft 52 with a plurality of belts 66 trained about the pulleys drivingly to connect the blade shaft to the jack shaft. A wooden platform 70 is mounted upon the central frame portion 34 and particularly upon the braces 42 to extend above the blade shaft 52 and beside the blade 54. Planks which are sawn from logs fall onto this platform, and the platform serves to protect the operator. Additionally, it will be appreciated that the belts 66 can be covered with a belt shield to protect the operator.

Figure 6:
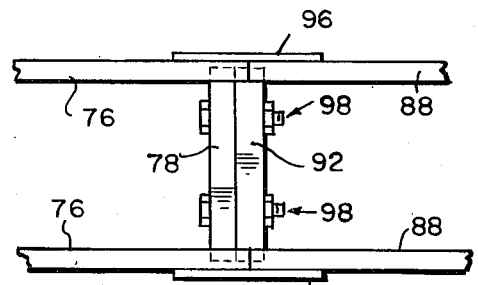
FIGS. 6 and 7 are fragmentary enlarged views showing the manner in which I may connect the outer track portions to the central track portions.
Figure 7:
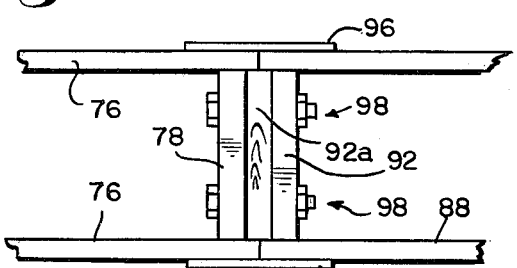

Mounted upon the central frame portion 34 is the central track portion 74 which extends longitudinally along the sawmill and perpendicularly to the axis of the blade shaft 52. The central track portion 74 is provided primarily by side members 76 which are channel members and end members or cross braces 78. Mounted upon each side member 76 to extend longitudinally therealong is a track member 80 the illustrative track members are inverted T-shaped members or L-shaped members. Outer track portions 84, 86 are mounted, respectively, to the outer ends of the central track portion to provide a three-section, rectilinear trackway extending generally horizontally and perpendicular to the rotational axis of the saw blade 54. Each outer track portion 84, 86 is provided primarily by longitudinally extending side members 88 and transversely extending end members or cross members 90, 92. Track members 80a extend longitudinally along the upper surface of each side member 88 to mate, respectively, with the track members 80. The proximal ends, therefore, of the outer track members are releasably but rigidly connected to the outer ends, respectively, of the central track portion while the distal ends of the outer track portions extend longitudinally outwardly a distance approximately equal to the central track portion. My illustrative connection means for the track portions are shown best in FIGS. 6 and 7. I prefer that clamping bars 96 be welded or otherwise rigidly attached to the outer surfaces of the side members 88 to extend in the direction parallel to the side members and to clamp against the side members 76 of the central track portion. These clamping bars facilitate the alignment of the track portions during assembly, and assist in maintaining alignment and structural rigidity after assembly. The releasable connection means also includes, in the illustrative embodiment, fastening elements 98 which penetrate the adjacent end members 78, 92 of the central and outer track portions. When the fastening elements 98 are tightened, the track portions are rigidly fastened together. In the embodiment of FIG. 7, I show the end members 78, 92 spaced apart with a block of wood 92a therebetween and with the fastening elements penetrating the end members and the block of wood. The fastening elements draw the end members 78, 92 tightly in against the block of wood 92a. While the block of wood 92a may be advantageous in some instances, I have found that the structure shown in FIG. 6 works quite satisfactorily.

In order to support the outer ends of the outer track portions 84, 86 against downward deflection, I use removable braces 106. In the illustrative and preferred embodiment, these removable braces 106 are hollow pieces of steel pipe generally square in cross section. I then provide rigid posts 108 extending upwardly from the skids 38 to be received within the lower ends of the support braces 106. The upper ends of the support braces bear against blocks 110 welded or otherwise securely fastened to the side members 88 of the outer track portions and the upper ends of the support braces are further connected to the outer track portions by means of fastening elements 112.

Cable pulleys 114 are journal mounted upon each outer track portion, for instance, on the cross braces indicated at 116. Each outer track portion and even the central track portion may have other cross braces such as indicated at 118 as needed.

Figure 4:
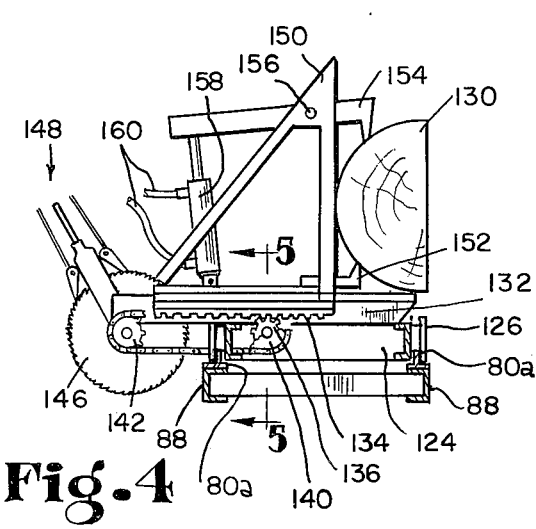
FIG. 4 is a fragmentary sectional view taken generally along the lines 4—4 in FIG. 1.
Figure 5:
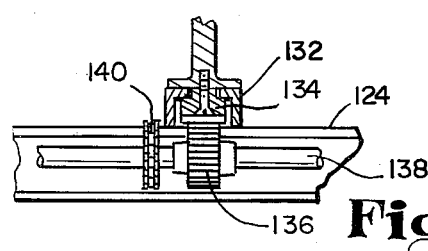
FIG. 5 is a fragmentary sectional view taken generally along the lines 5—5 in FIG. 4.

A carriage 124 is mounted upon the trackway provided by the track portions by means such as the illustrative wheels 126 for movement longitudinally from end to end thereof, and bumper guards 128 are provided at the distal ends of the outer track portions to keep the carriage on the track. Pieces of timber such as indicated at 130 are placed upon the carriage 124 for movement therewith past the saw blade 54. The pieces of timber may be clamped on the carriage and fed to the saw blade by means more or less conventional including, in the illustrative embodiment, three clamping frames which are mechanically tied together. Each such frame includes a frame element 132 (FIGS. 4 and 5) extending generally parallel to the axis of the blade shaft 52 and which is mounted for reciprocation in the direction of its extension. Each such frame element 132 carries a rack 134 which is meshed with a pinion 136 mounted upon a pinion shaft 138 extending longitudinally along the carriage 124. The pinion shaft 138 is driven by means of a sprocket 140 mounted thereon, a sprocket 142 mounted rearwardly thereof (to the right as viewed in FIG. 3 and to the left as viewed in FIG. 4) and a chain 144 trained about the sprocket. The sprocket 142 is mounted upon a shaft with a pair of ratchet wheels 146 which are constructed to turn the shaft in opposite directions as the ratchet wheels are engaged and driven by a pawl lever 148. Such a pawl lever and ratchet wheel combination has been used for many years in sawmills to feed the logs toward the blade. As viewed in FIG. 4, each time the lever 148 is pivoted in the clockwise direction to advance the sprocket 142 in the clockwise direction, the sprocket 140 and the pinion shaft 138 are driven in the clockwise direction to advance the rack 134 and the frame element 132 mounted thereon to the right. It will be appreciated that there are pinions 136 and racks 134, respectively, for each of the frame elements 132 upon which the piece of timber 130 is mounted.

Each frame element 132 supports a bracket 150 having a vertically extending, forwardly facing portion against which the piece of timber is mounted with a lower clamp 152 fixed to the bracket to engage the piece of timber. The upper clamp 154, in the illustrative embodiment, is pivotally movable about a pivot point 156 and hydraulically driven to clamp the piece of timber by means of the hydraulic cylinder 158, the hydraulic hoses for which are indicated at 160. The hydraulic hoses 160 may be connected to the hydraulic system of the tractor and by support means (not shown) held out of the way of the movement of the sawmill.

While hydraulically-actuated clamps are shown, it will be appreciated that I may use manual clamps to clamp the logs and pieces of timber to the carriage for movement therewith past the blade.

Figure 9:
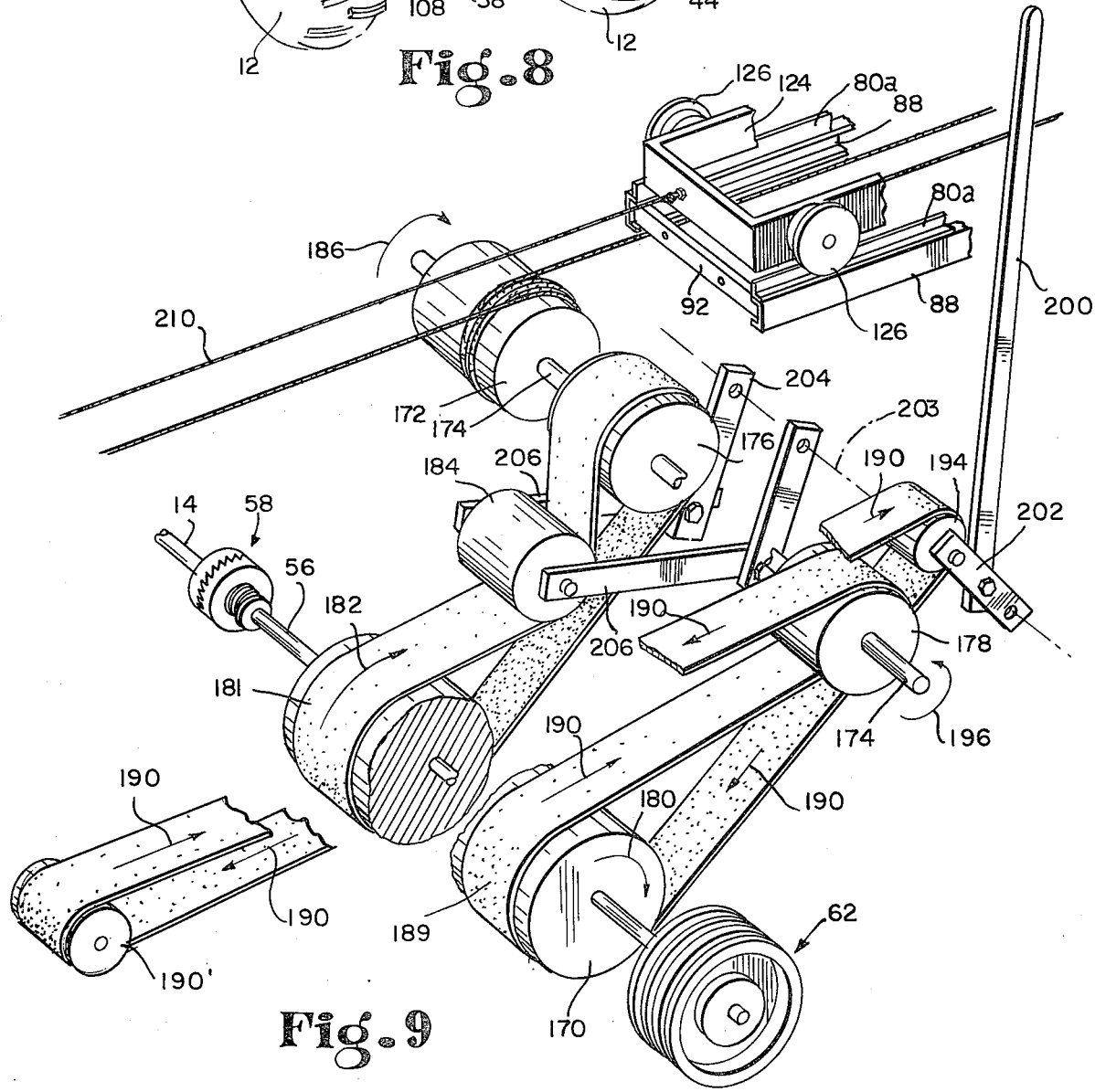
FIG. 9 is an exploded perspective view of the drive system which drivingly connects the carriage to the power take-off shaft of the tractor.

Referring now particularly to FIG. 9, it will be seen that I have shown the manner in which I obtained the reciprocation movement of the carriage 124. I mount a pulley 170 on the jack shaft 56 for movement therewith and a cable drum 172 on a drum shaft 174 which is parallel to the jack shaft 56. I provide one pulley 176 on the drum shaft 174 for movement of the carriage in one direction and another pulley 178 on the drum shaft 174 for movement of the carriage in the opposite direction. The arrow 180 represents the direction of rotation of the jack shaft 56 such that the belt 181 drivingly connecting the pulley 170 with the pulley 176 moves in the direction of the arrow 182 to drive the pulley 176 in the same direction as the pulley 170. Particularly, when the idler 184 is tightened against the belt 181, the pulley 176 and the drum 172 are driven in the clockwise direction as indicated by the arrow 186 to move the carriage 124 to the left as viewed in FIG. 9. Then, the belt 189 drives the pulley 178 and the drum 172 in the opposite direction. The belt 189 is trained about the pulley 170 and then under and over the pulley 178 and another fixed idler 190' before it is trained over the clutch idler 194, the arrows 190 representing the direction of movement of the belt 189. When the idler clutch 194 is shifted to the right as viewed in FIG. 9, the belt 189 is tightened on the pulley 178 to drive the pulley 178 and the drum 172 in the counterclockwise direction as indicated by the arrow 196. The idler pulleys 184, 194 are controlled by an operator's lever 200 which is pivotal about an axis 203. A link 202 drivingly connects the idler pulley 194 directly to the lever 200 such that clockwise movement of the lever produces clockwise movement of the idler pulley 194. Rigid links 204, 206 also drivingly connect the idler pulley 184 to the lever 200 such that counterclockwise movement of the lever tightens the idler pulley 184 against the belt 181.

Figure 8:
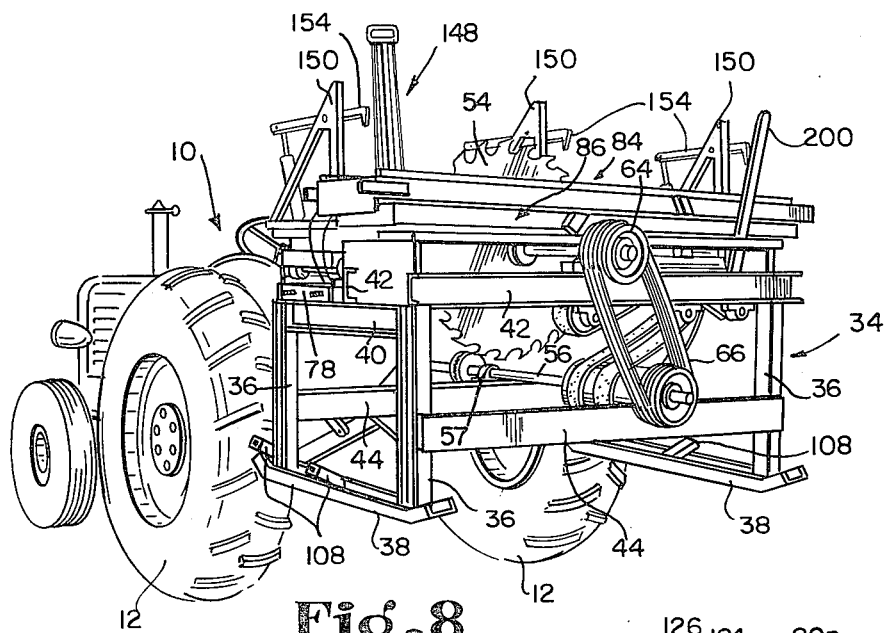
FIG. 8 is a perspective view showing a tractor with my sawmill mounted thereon and raised to its carrying position.

The belt-pulley-clutch arrangement shown in FIG. 9 is constructed such that when the lever 200 is in its center position, the system is in equilibrium such that the drum 172 is not driven in either direction by rotation of the jack shaft 156. Slight movement of the lever 200 to the right or clockwise causes movement of the carriage 124 to the right and slight movement of the lever 200 to the left causes movement of the carriage 124 to the left. The cable 210 which is wrapped four times about the drum 172 is also trained about the pulleys 114 and then connected to opposite ends of the carriage 124. When the sawmill is to be collapsed, i.e., the outer track portions 84, 86 disconnected from the center track portion 74, the fastening elements 112 may be loosened such that the operator can lift upwardly on the outer ends of the outer track portions to remove the cable 210 from the pulleys 114. The reverse of this process is used to train the cable 210 about the pulleys. Particularly, before the fastening elements 112 are fastened, during the assembly operation, the operator lifts up on the outer end of the outer track portion to place the cable 210 over the pulleys 114. When the outer end of the track portion is lowered, the cable is tightened and the fastening elements 112 are used to secure that relationship. The collapsed condition of my saw-mill is shown in FIG. 8 with the central frame portion raised by the tractor for movement with the tractor.

I claim:
1. For use with a conventional tractor having, at its rear, a 3-point hitch and power take-off shaft extending rearwardly therefrom, a tractor mounted and driven sawmill comprising a central frame adapted to be mounted upon and raised and lowered by said 3-point hitch, said central frame having leg means engaging the ground in its lowered position, a saw blade journal mounted upon said central frame for rotation about a transverse axis, said central frame providing a central track portion extending longitudinally and perpendicular to said journal axis of said blade, said central track portion having opposite ends, a pair of outer track portions, means for rigidly and releasably connecting said outer track portions to said opposite ends, respectively, to provide a three-section rectilinear trackway perpen- dicular to said blade axis, a carriage mounted on said trackway for movement therealong past said blade, means for drivingly connecting said power take-off shaft to said blade and carriage to drive said blade about said axis and to reciprocate said carriage along said trackway, and means for mounting pieces of timber on said carriage for movement therewith past said blade, said sawmill having a collapsed condition with said outer track portions disconnected from said central track portion for movement by said tractor.

2. The invention of claim 1 in which each said outer track portion is proportioned and designed to be mounted upon said central frame parallel to said central track portion in said collapsed condition, said outer track portions being substantially the same length as said central track portion, whereby, in its collapsed condition, said sawmill has a length substantially equal to the length of said central track portion.

3. The invention of claim 2 in which said central track portion extends across the rear of said tractor and has a length substantially equal to the width of said tractor.

4. The invention of claim 1 in which said driving connection means includes a jack shaft journal mounted on said central frame for rotation about an axis generally parallel to said blade axis, and belt means providing a driving connection between said blade and said jack shaft.

5. The invention of claim 4 including a drum journal mounted on said central frame, pulleys journal mounted on the outer ends, respectively, of said outer track portions, and cable means trained about said pulleys and drum, said carriage being connected to said cable means such that rotation of said drum in one direction moves said carriage in one direction and rotation of said drum in the opposite direction moves said carriage in the opposite direction, and belt-clutch means drivingly connecting said drum to said jack shaft.

6. The invention of claim 5 including a torque breakaway clutch means drivingly connecting said jack shaft to said power take-off shaft.

7. In combination, a conventional farm tractor having axially spaced apart rear drive wheels, a 3-point hitch and power take-off shaft extending rearwardly therefrom, and a tractor mounted and driven sawmill comprising a central frame mounted upon said 3-point hitch for movement with said tractor and for movement relative to said tractor with said hitch between an upper carrying position and a lower use position, a saw blade journal mounted upon said central frame for rotation about an axis extending generally rearwardly from said tractor and, when said central frame is in said lower use position, generally horizontally, said central frame providing a central track portion extending perpendicularly to said blade journal axis, said central track portion having opposite ends, a pair of outer track portions, means for rigidly and releasably connecting said outer track portions to said opposite ends, respectively, to provide a three-section rectilinear trackway perpendicular to said blade axis, a carriage mounted on said track-way for reciprocation therealong past said blade, transmission means for drivingly connecting said power take-off shaft to said blade and carriage, and means for mounting pieces of timber on said carriage for movement therewith past said blade, said sawmill having a collapsed condition for movement by said tractor with said outer track portions disconnected from said central track portion and said carriage disposed on said central track portion.

8. The invention of claim 7 in which each said outer track portion is proportioned and designed to be mounted upon said central track portion in said collapsed condition to be parallel to said central track portion, said outer track portions being substantially the same length as said central track portion, whereby, in its collapsed condition, said sawmill has a length substantially equal to the length of said central track portion.

9. The invention of claim 8 in which said central track portion extends across the rear of said tractor and has a length substantially equal to the width of said tractor.

10. The invention of claim 7 in which said transmission means includes a jack shaft journal mounted on said central frame for rotation about an axis generally parallel to said blade axis, and belt means providing a driving connection between said blade and said jack shaft.

11. The invention of claim 10 in which said transmission includes a drum journal mounted on said central frame, pulleys journal mounted on the outer ends, respectively, of said outer track portions, and cable means trained about said pulleys and drum, said carriage being connected to said cable means such that rotation of said drum in one direction moves said carriage in one direction and rotation of said drum in the opposite direction moves said carriage in the opposite direction, and belt-clutch means drivingly connecting said drum to said jack shaft.

12. The invention of claim 7 in which each said outer track portion is an elongated rectangular rigid framework defined by longitudinally extending side members and transversely extending end members, each outer track portion having a proximal end adjacent its respective outer end of the central track portion and a distal end, said central track portion being defined by longitudinally extending side members and transversely extending end members, said connecting means including fastening elements penetrating the adjacent end members of said central track portion and outer track portions.

13. The invention of claim 7 in which each said outer track portion is an elongated rectangular rigid framework defined by longitudinally extending side members and transversely extending end members, each outer track portion having a proximal end adjacent its respective outer end of the central track portion and a distal end, said central track portion being defined by longitudinally extending side members and transversely extending end members, and said outer track portions having, at their proximal ends, clamping bars attached to the outer sides of the side members to engaage and bear against the outer sides, respectively, of the central track portion outer side members.

* * * * *